US011939886B2

(12) United States Patent
Azmi et al.

(10) Patent No.: US 11,939,886 B2
(45) Date of Patent: Mar. 26, 2024

(54) AIRCRAFT ENGINE HAVING STATOR VANES MADE OF DIFFERENT MATERIALS

(71) Applicant: PRATT & WHITNEY CANADA CORP., Longueuil (CA)

(72) Inventors: Ali Azmi, Pickering (CA); Karan Anand, Mississauga (CA); Alexandre Capron, Toronto (CA); Tammy Yam, Richmond Hill (CA); Sylvain Claude, Saint-Lambert (CA); Krishna Prasad Balike, Brampton (CA); Anthony Robert Bruni, Toronto (CA); Juan Ignacio Ruiz-Gopegui Gonzalez, Alcobendas (ES); César Carlos Valbuena Merino, Bilbao (ES); Ignacio Javier Ucin Jarne, Bilbao (ES)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/804,572

(22) Filed: May 30, 2022

(65) Prior Publication Data

US 2023/0383660 A1 Nov. 30, 2023

(51) Int. Cl.
*F01D 9/04* (2006.01)
*F01D 5/14* (2006.01)
(Continued)

(52) U.S. Cl.
CPC ............... *F01D 9/04* (2013.01); *F01D 5/141* (2013.01); *F01D 5/28* (2013.01); *F01D 9/041* (2013.01);
(Continued)

(58) Field of Classification Search
CPC ........ F01D 25/005; F01D 25/04; F01D 25/06; F01D 5/28; F01D 5/282; F01D 5/284;
(Continued)

(56) References Cited

U.S. PATENT DOCUMENTS

| | | | | |
|---|---|---|---|---|
| 2,798,661 A | | 7/1957 | Willenbrock et al. | |
| 3,830,058 A | * | 8/1974 | Ainsworth | F02C 7/20 244/54 |

(Continued)

FOREIGN PATENT DOCUMENTS

| | | |
|---|---|---|
| EP | 0839259 | 3/1999 |
| EP | 2861827 | 9/2018 |

(Continued)

OTHER PUBLICATIONS

European Search Report dated Nov. 7, 2023 for corresponding application No. 23176107.3.

*Primary Examiner* — Justin D Seabe
*Assistant Examiner* — Behnoush Haghighian
(74) *Attorney, Agent, or Firm* — NORTON ROSE FULBRIGHT CANADA LLP

(57) ABSTRACT

An aircraft engine, has: an upstream stator having upstream stator vanes circumferentially distributed about a central axis; and a downstream stator having downstream stator vanes circumferentially distributed about the central axis, the downstream stator located downstream of the upstream stator relative to an airflow flowing within a core gaspath of the aircraft engine, a number of the upstream stator vanes being different than a number of the downstream stator vanes, the downstream stator vanes including: a first vane made of a first material, a major portion of a leading edge of the first vane circumferentially overlapped by one of the upstream stator vanes, and a second vane made of a second material having a greater stiffness, strength, and/or ductility than that of the first material, a major portion of a leading (Continued)

edge of the second vane exposed via a spacing defined between two of the upstream stator vanes.

18 Claims, 3 Drawing Sheets

(51) Int. Cl.
*F01D 5/28* (2006.01)
*F01D 21/04* (2006.01)
*F01D 25/24* (2006.01)

(52) U.S. Cl.
CPC ............ *F01D 9/042* (2013.01); *F01D 21/045* (2013.01); *F01D 25/246* (2013.01); *F05D 2220/323* (2013.01); *F05D 2230/60* (2013.01); *F05D 2240/121* (2013.01); *F05D 2250/312* (2013.01); *F05D 2300/121* (2013.01); *F05D 2300/171* (2013.01)

(58) Field of Classification Search
CPC ... F01D 5/286; F01D 5/10; F01D 5/16; F01D 5/26; F01D 9/04–048; F04D 29/02; F04D 29/542
See application file for complete search history.

(56) References Cited

U.S. PATENT DOCUMENTS

| | | | | |
|---|---|---|---|---|
| 4,791,783 | A * | 12/1988 | Neitzel | F02K 3/075 60/226.3 |
| 5,152,661 | A | 10/1992 | Sheets | |
| 5,740,674 | A * | 4/1998 | Beutin | F01D 9/042 415/142 |
| 5,984,631 | A | 11/1999 | Tolgos | |
| 6,139,259 | A | 10/2000 | Ho et al. | |
| 7,743,497 | B2 * | 6/2010 | Gautreau | F04D 29/666 29/402.09 |
| 8,087,253 | B2 | 1/2012 | Ning et al. | |
| 8,162,603 | B2 * | 4/2012 | Schilling | F01D 5/28 415/209.4 |
| 9,482,237 | B1 | 11/2016 | Pesteil et al. | |
| 9,605,540 | B2 * | 3/2017 | Lin | F01D 5/141 |
| 9,650,915 | B2 | 5/2017 | Calza et al. | |
| 9,810,082 | B2 | 11/2017 | Calza | |
| 9,845,692 | B2 * | 12/2017 | Jamison | F01D 25/005 |
| 9,909,434 | B2 | 3/2018 | Tsifourdaris et al. | |
| 10,094,223 | B2 | 10/2018 | Yu et al. | |
| 10,400,606 | B2 * | 9/2019 | Roche | F01D 5/28 |
| 10,526,905 | B2 * | 1/2020 | Estes | F01D 9/041 |
| 10,808,543 | B2 * | 10/2020 | Grelotti | F02C 3/04 |
| 10,895,268 | B2 * | 1/2021 | Taguchi | F04D 29/38 |
| 11,073,021 | B2 * | 7/2021 | Roche | F01D 5/16 |
| 11,580,633 | B2 * | 2/2023 | De Agostini | F01D 25/246 |
| 2010/0196147 | A1 * | 8/2010 | Schilling | F04D 29/522 415/173.1 |
| 2012/0328432 | A1 | 12/2012 | Ramakrishnan et al. | |
| 2013/0082553 | A1 | 4/2013 | Shoji | |
| 2014/0083103 | A1 | 3/2014 | Gregg et al. | |
| 2014/0112769 | A1 | 4/2014 | Schoenenborn | |
| 2014/0212284 | A1 * | 7/2014 | Jamison | F01D 9/042 29/889 |
| 2015/0198047 | A1 * | 7/2015 | Roche | F01D 5/10 416/241 R |
| 2015/0227677 | A1 | 8/2015 | Sharma et al. | |
| 2016/0097281 | A1 * | 4/2016 | Hanrahan | F01D 5/12 415/193 |
| 2016/0146040 | A1 | 5/2016 | Simpson et al. | |
| 2016/0230584 | A1 | 8/2016 | Grover | |
| 2017/0114795 | A1 * | 4/2017 | Englebert | F04D 29/023 |
| 2017/0114802 | A1 | 4/2017 | Passrucker et al. | |
| 2018/0156235 | A1 | 6/2018 | Li et al. | |
| 2018/0283189 | A1 * | 10/2018 | Estes | F01D 9/041 |
| 2020/0063755 | A1 * | 2/2020 | Taguchi | F04D 29/542 |
| 2020/0123906 | A1 * | 4/2020 | Roche | F01D 5/16 |
| 2020/0291862 | A1 | 9/2020 | Bousfield et al. | |
| 2022/0162953 | A1 | 5/2022 | Jones et al. | |
| 2022/0172336 | A1 * | 6/2022 | De Agostini | F01D 9/04 |

FOREIGN PATENT DOCUMENTS

| | | |
|---|---|---|
| EP | 3940200 | 1/2022 |
| GB | 2046849 | 11/1980 |

* cited by examiner

AIRCRAFT ENGINE HAVING STATOR VANES MADE OF DIFFERENT MATERIALS

TECHNICAL FIELD

The application relates generally to aircraft engines and, more particularly, to systems and methods used to protect airfoils of such engines from foreign object damage.

BACKGROUND

In certain operating conditions, aircraft engines, such as turbofan engines, may be subjected to foreign object damage (FOD). FOD may occur when a foreign object (e.g., ice) is ingested by the engine and damages an airfoil of a rotor or a stator. The damaged airfoil is typically impacted at its leading edge. This may result in performance loss, imbalance, and so on. Improvements are therefore sought.

SUMMARY

In one aspect, there is provided an aircraft engine, comprising: an upstream stator having upstream stator vanes circumferentially distributed about a central axis; and a downstream stator having downstream stator vanes circumferentially distributed about the central axis, the downstream stator located downstream of the upstream stator relative to an airflow flowing within a core gaspath of the aircraft engine, a number of the upstream stator vanes being different than a number of the downstream stator vanes, the downstream stator vanes including: a first vane made of a first material, a major portion of a leading edge of the first vane circumferentially overlapped by one of the upstream stator vanes, and a second vane made of a second material having a greater stiffness, strength, and/or ductility than that of the first material, a major portion of a leading edge of the second vane exposed via a spacing defined between two of the upstream stator vanes.

The aircraft engine may include any of the following features, in any combinations.

In some embodiments, the major portion of the leading edge include at least 50% of a span of the downstream stator vanes.

In some embodiments, the major portion is a radially-outer portion.

In some embodiments, the major portion includes a tip section.

In some embodiments, the first material is aluminum and the second material is steel.

In some embodiments, zones are circumferentially distributed about the central axis where major portions of leading edges of the downstream stator vanes are exposed via the spacing, the first vane located between two of the zones, the second vane located within one of the zones.

In some embodiments, the stiffness of the second material is at least two times greater than that of the first material.

In some embodiments, the downstream stator includes vane segments distributed about the central axis, each of the vane segments having one or more of the downstream stator vanes.

In some embodiments, the vane segments include a first vane segment each including the first vane, and a second vane segment including the second vane.

In another aspect, there is provided a stator assembly, comprising: an upstream stator having upstream stator vanes circumferentially distributed about a central axis; and a downstream stator having downstream stator vanes circumferentially distributed about the central axis, the downstream stator located downstream of the upstream stator relative to an airflow flowing through the stator assembly, a number of the upstream stator vanes being different than a number of the downstream stator vanes, the downstream stator vanes including: a first vane made of a first material, a major portion of a leading edge of the first vane circumferentially overlapped by one of the upstream stator vanes, and a second vane made of a second material having a greater stiffness, strength, and/or ductility than that of the first material, a major portion of a leading edge of the second vane exposed via a spacing defined between two of the upstream stator vanes.

The stator assembly may include any of the following features, in any combinations.

In some embodiments, the major portion of the leading edge includes at least 50% of a span of the downstream stator vanes.

In some embodiments, the major portion is a radially-outer portion.

In some embodiments, the major portion includes a tip section.

In some embodiments, the first material is aluminum and the second material is steel.

In some embodiments, the downstream stator includes vane segments distributed about the central axis, each of the vane segments having one or more of the downstream stator vanes.

In some embodiments, the vane segments include a first vane segment including the first vane, and a second vane segment including the second vane.

In yet another aspect, there is provided a method of manufacturing a downstream stator of a stator assembly, the stator assembly including an upstream stator and the downstream stator located downstream of the upstream stator, the method comprising: determining circumferential positions around a central axis of the stator assembly where vanes of the downstream stator are at least partially exposed between vanes of the upstream stator thereby susceptible to foreign object damage; installing a first vane of the downstream stator between two of the circumferential positions, the first vane made of a first material; and installing a second vane of the downstream stator at one of the circumferential positions, the second vane made of a second material having a greater stiffness, strength, and/or ductility than that of the first material of the first vane.

The method may include any of the following features, in any combinations.

In some embodiments, the installing of the first vane includes installing the first vane made of aluminum, the installing of the second vane includes installing the second vane made of steel.

In some embodiments, the installing of the second vane includes installing the second vane having the stiffness two times greater than that of the first vane.

In some embodiments, the downstream stator includes vane segments distributed about the central axis, each of the vane segments having one or more of the downstream stator vanes, the vane segments including a first vane segment including the first vane and a second vane segment each including the second vane, the installing of the second vane at the one of the circumferential positions including installing the second vane segment at the one of the circumferential position.

BRIEF DESCRIPTION OF THE DRAWINGS

Reference is now made to the accompanying figures in which.

DETAILED DESCRIPTION

Figure 1:
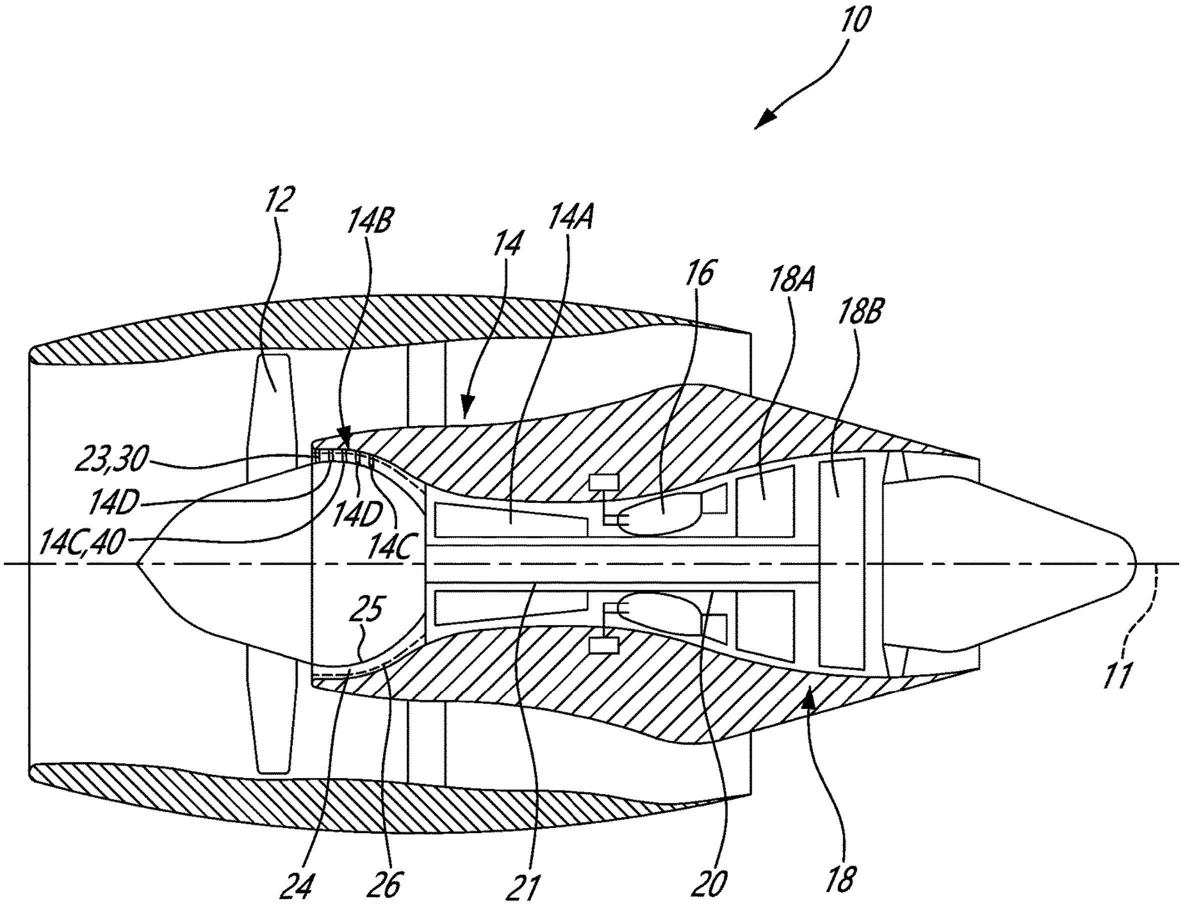
FIG. 1 is a schematic cross-sectional view of an aircraft engine depicted as a gas turbine engine.

FIG. 1 illustrates an aircraft engine depicted as a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The fan 12, the compressor section 14, and the turbine section 18 are rotatable about a central axis 11 of the gas turbine engine 10. In the embodiment shown, the gas turbine engine 10 comprises a high-pressure spool having a high-pressure shaft 20 drivingly engaging a high-pressure turbine 18A of the turbine section 18 to a high-pressure compressor 14A of the compressor section 14, and a low-pressure spool having a low-pressure shaft 21 drivingly engaging a low-pressure or power turbine 18B of the turbine section 18 to a low-pressure compressor 14B of the compressor section 14 and drivingly engaged to the fan 12.

Although illustrated as a turbofan engine, the gas turbine engine 10 may alternatively be another type of engine, for example a turboshaft engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply. The engine may have one or more spools.

Still referring to FIG. 1, in the embodiment shown, a fan stator 23 is located within a core gaspath 24 of the gas turbine engine 10. The fan stator 23 is located downstream of the fan 12 relative to a flow within the core gaspath 24. The low-pressure compressor 14B also referred to as a boost compressor, includes successive rows of stators 14C and rotors 14D. A first rotor 14D of the low-pressure compressor 14B may be located downstream of the fan stator 23 and upstream of a first stator 14C of the low-pressure compressor 14B. The first stator 14C may be the first stator the flow within the core gaspath 24 meets after it leaves the fan stator 23. The fan stator 23 and the low-pressure compressor 14B are located within the core gaspath 24, which is defined between an inner wall 25 and an outer wall 26. This core gaspath 24 is located radially inwardly of an annular gaspath that extends around an engine core. Each of the core stator 23, and the rotors 14D and stators 14C include airfoils extending through the core gaspath 24.

For the remainder of the present disclosure, the fan stator 23 will be referred to as an upstream stator 30 and the first stator 14C of the low-pressure compressor 14B will be referred to as a downstream stator 40. It will be understood that the principles of the present disclosure may apply to any combinations of two stators in serial flow communication with each other. These two stators may be located at any suitable locations along the core gaspath 24. Any pair of stators may benefit from the present disclosure.

Figure 2:
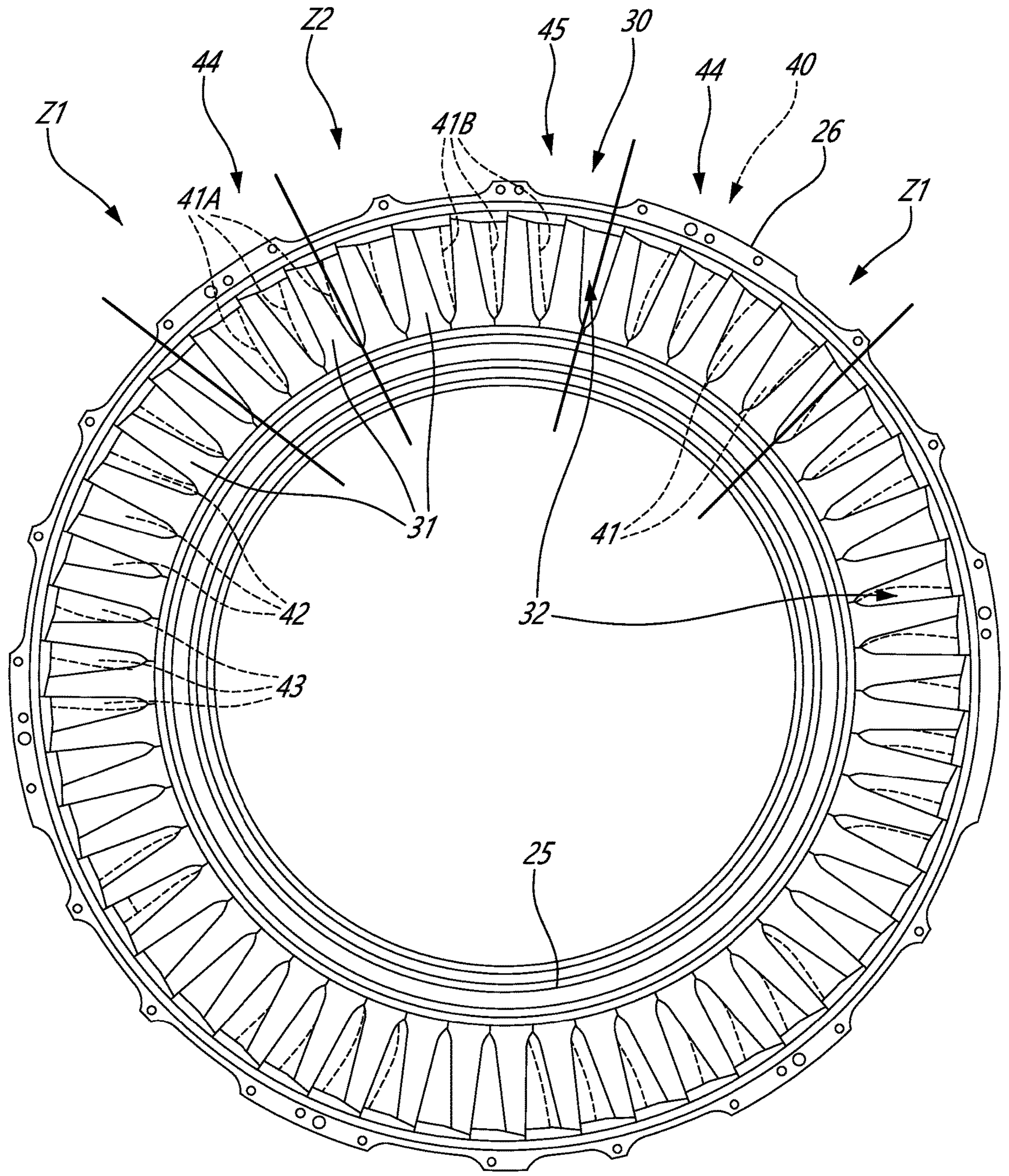
FIG. 2 is a front view of a stator assembly including an upstream stator and a downstream stator of the gas turbine engine of FIG. 1.

Referring now to FIG. 2, a front view of a section of the gas turbine engine 10 is presented and illustrates the upstream stator 30 in foreground and the downstream stator 40 in background. The upstream stator 30 includes upstream stator vanes 31 circumferentially distributed about the central axis 11. The upstream stator vanes 31 extend in a direction having a radial component relative to the central axis 11 from the inner wall 25 to the outer wall 26. The downstream stator 40 has downstream stator vanes 41 circumferentially distributed about the central axis 11. The downstream stator vanes 41 extend in a direction having a radial component relative to the central axis from the inner wall 25 to the outer wall 26. For the sake of clarity, in FIG. 2, outlines of the downstream stator vanes 41 are shown with dashed lines. The downstream stator 40 and its downstream stator vanes 41 are located rearward of the upstream stator 30 and the upstream stator vane 31. Thus, the airflow meets the upstream stator 30 before it meets the downstream stator 40.

A number of the upstream stator vanes 31 may be different (e.g., more, less) than a number of the downstream stator vanes 41. The number of the upstream stator vanes 31 may not be a multiple of the number of the downstream stator vanes 41 and vice versa. Consequently, some of the downstream stator vanes 41 may be exposed (e.g. visible) via spacing 32 defined between circumferentially adjacent upstream stator vanes 31. As shown in FIG. 2, some of the downstream stator vanes 41 are visible through the upstream stator 30. In other words, some of the downstream stator vanes 41 have areas exposed and visible via the spacing 32 defined between the upstream stator vanes 31. Because of the different numbers in upstream stator vanes 31 and downstream stator vanes 41, some of the downstream stator vanes 41 may be more susceptible to foreign object damage (FOD) because sensitive sections of those downstream stator vanes 41 may become exposed to FOD via the spacing 32 between the upstream stator vanes 31. In FIG. 2, the downstream stator vanes 41 located at a plurality of circumferential positions, herein, at 1 o'clock, 3 o'clock, 5 o'clock, 7 o'clock, 9 o'clock, and 11 o'clock, may be most susceptible to FOD. Circumferential positions of the downstream stator vanes 41 susceptible to FOD may vary as a function of a number of the upstream stator vanes 31 and as a function of a number of the downstream stator vanes 41.

The sensitive areas of the downstream stator vanes 41 may correspond to leading edges of the downstream stator vanes 41. In some cases, the sensitive areas may correspond to the trailing edges. The thinner areas of the airfoils may correspond to the sensitive areas. More specifically, tip sections of the leading edges of the downstream stator vanes 41 may be particularly prone to FOD. Herein, the expression tip sections may include a radially-outer 50% of a span of the downstream stator vanes 41. In some cases, the outer section of the span may include from 40% to 50% of the span. It may include all of the span in some cases. In some embodiments, base sections of the downstream stator vanes 41 may be the sensitive areas; the base sections extending from 0% to 50% span from the radially-inner ends. In some cases, the tip sections includes a radially-outer 40%, or a radially-outer 30% in some cases, of the span. In some other cases, the tip sections includes a radially-outer 20% of the span. The tip sections of the leading edges of the downstream stator vanes 41 may be more sensitive to FOD because the downstream stator vanes 41 may decrease in both chord and thickness towards tips of the downstream stator vanes 41. This, in turn, may result in the tip sections of the downstream stator vanes 41 less stiff than a remainder of the downstream stator vanes 41 and, consequently, more susceptible to FOD. In some embodiments, the thickness distribution of the vane is constant along their spans. In the embodiment shown, the exposed part of the vanes is increasing from inner ends to outer ends. In this case, for the lower part, only small ice pellet may impact. For the higher part bigger ice pellets may impact. Small ice pellets may have less energy and may make less damage than bigger ice pellets closer to the tip. This may be engine-dependant. Some engine will fly at low speed and may be susceptible to FOD near the tip. Some other engine will fly much faster and may be susceptible to FOD closer to the radially inner ends of the vane. Small ice pellet at high speed might cause more damage than big pellets at low speed.

Still referring to FIG. 2, the downstream stator vanes 41 may be divided in two groups: a first group including first vanes and a second group include at least a second vane. Major portions of leading edges 41A of the first vanes may be circumferentially overlapped by the upstream stator vanes 31. That is, the major portions of the leading edges of the first vanes may be not visible when looking in a direction parallel to the central axis 11 and parallel to a direction of an air flow flowing through the gas turbine engine 10. The first vanes may be substantially shielded or protected against FOD by the upstream stator vanes 31. In other words, major portions of the first vanes may not be visible via the spacing 32 defined between the upstream stator vanes 31. In some embodiments, major portions of the leading edges 41A of the first vanes may not be visible via the spacing 32 defined between the upstream stator vanes 31. Herein, the expression "major portions" may include 50% or more of a span of the downstream stator vanes 41. In some embodiments, major portions include 80%, 90%, or 100% of the span of the vane. Major portions may include radially-outer 50% of the span. The major portions may include tip sections of the downstream stator vanes 41. The tip sections may include the outer 25% of the span of the downstream stator vanes 41. Since the first vanes of the downstream stator vanes 41 have their leading edges 41A substantially overlapped, and thus covered, by the upstream stator vanes 31, they may be less susceptible of being impacted by a foreign object. The first vanes of the downstream stator vanes 41 are labelled with reference numeral 42 in FIG. 2. The at least second vane of the downstream stator vanes 41 is exposed to FOD because a major portion of its leading edges 41A is visible via the spacing 32 defined between the upstream stator vanes 31. The second vanes of the downstream stator vanes 41 are labelled with reference numeral 43 in FIG. 2.

Still referring to FIG. 2, each of the downstream stator vanes 41 may be thin at its leading edge 41A and increase to a maximum thickness along a chord before tapering back down towards its trailing edge 41B. A downstream stator vane 41 may be considered at risk of FOD if the downstream stator vane 41 is exposed (e.g., visible within one of the spacing between two upstream stator vanes 31) anywhere along the chord from its leading edge 41A to a location of maximum thickness. In other words, the major portions of the leading edges may correspond to leading edge sections extending along chords of the downstream stator vanes 41 from the leading edges 41A to locations of maximum thickness. The leading edge sections at spanwise locations closer to tips of the downstream stator vanes 41, for instance at the tip sections of the downstream stator vanes 41, may be more prone to FOD. Hence, the downstream stator vanes 41 having their leading edge sections along their tip sections (e.g., outer 25% of their span) exposed within the spacing 32 may be susceptible to FOD and may be considered a second vane 43.

The downstream stator vanes 41 may have their trailing edges 41B visible via the spacing 32 between the upstream stator vanes 31. However, the trailing edges 41B, because they are not facing the incoming flow, may be less susceptible to FOD. Moreover, if a trailing edge of a downstream stator vane 41 is impacted, it may have less impact on overall aerodynamic performance of the downstream stator 40 than if a leading edge were impacted.

In the embodiment shown, the first vanes 42 are made of a first material and the second vanes 43 are made of a second material having a better ability to withstand impact without fracture than the first material. Any property of the second material, such as its stiffness, strength, or ductility may be increased to improve impact resistance. The first material may be aluminum and the second material may be steel. The stiffness, strength, and/or ductility of the second material may be at least about 10%, 15%, 20%, or 25% greater than that of the first material. The stiffness of the second material may be about two to three times that of the first material. The strength of the second material may be about from two to three times that of the first material. Herein, the expression "about" implies variations of plus or minus 10%.

As shown in FIG. 2, the downstream stator 40 may include FOD zones Z1 circumferentially distributed about the central axis 11 where major portions of the leading edges 41A of the downstream stator vanes are visible via the spacing 32. The first vanes 42 may be located between or outside the FOD zones Z1 whereas the second vanes 43 may be located within the FOD zones Z1. In other words, the downstream stator 40 may include FOD-free zones Z2 interspaced between the FOD zones Z1 and where there is a lesser risk of FOD. The first vanes 42 may be located within those FOD-free zones Z2.

The downstream stator 40 may be a segmented ring including a plurality of segments circumferentially distributed about the central axis 11. The segments may include first segments 44 including one or more of the first vanes 42 and second segments 45 including one or more of the second vanes 43. The first segments 44 may be located within the FOD-free zones Z2 whereas the second segments 45 may be located within the FOD zones Z1. The first vane segments 44 may be interspaced between the second vane segments 45.

Figure 3:
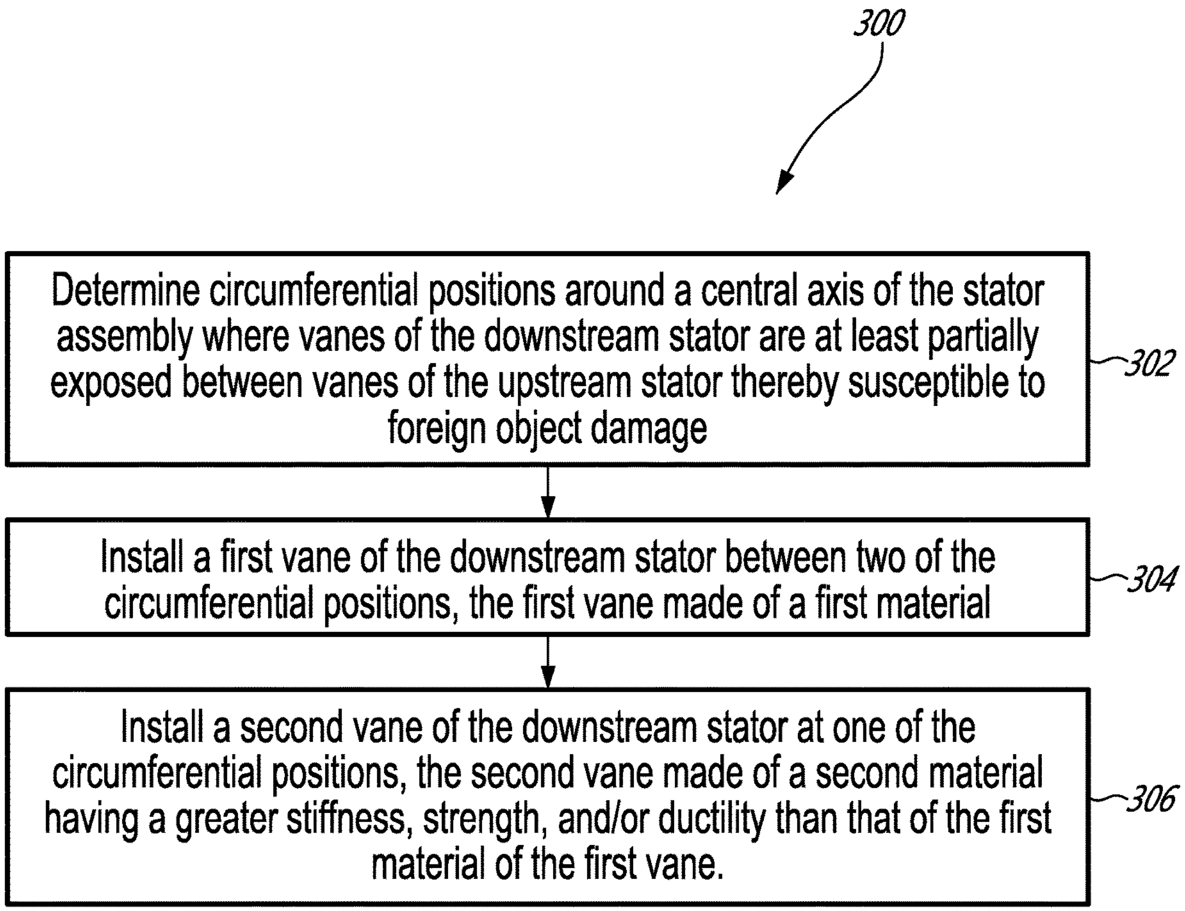
FIG. 3 is a flowchart illustrating steps of a method of manufacturing the downstream stator.

Referring now to FIG. 3, a method of manufacturing the downstream stator 40 is shown at 300. The method 300 includes determining circumferential positions around the central axis 11 where the vanes 41 of the downstream stator 40 are susceptible to foreign object damage via the spacing 32 defined between the vanes 31 of the upstream stator 30 at 302; installing the first vanes 42 of the downstream stator 40 between the circumferential positions at 304, the first vanes 42 made of a first material; and installing the second vanes 43 of the downstream stator 40 at the circumferential positions at 306, the second vanes 43 made of a second material having a stiffness greater than that of the first vanes 42.

In the present embodiment, the installing of the first vanes 42 includes installing the first vanes 42 made of aluminum and the installing of the second vanes 43 includes installing the second vanes 43 made of steel. The installing of the second vanes 43 may include installing the second vanes 43 having the stiffness, strength, and/or ductility 10%, 15%, 20%, or 25% greater than that of the first vanes 42.

In the embodiment shown, the installing of the second vanes 43 at the circumferential positions including installing the second vane segments 45 at the circumferential positions where the vanes are susceptible to FOD.

More than two materials may be used. Combining the two materials may allow to minimize a weight of the downstream stator while minimizing impact on engine performance. This arrangement of two or more materials may prevent FOD while minimizing weight and costs.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. An aircraft engine, comprising:
- an upstream stator having upstream stator vanes circumferentially distributed about a central axis; and
- a downstream stator having downstream stator vanes circumferentially distributed about the central axis, the downstream stator located downstream of the upstream stator relative to an airflow flowing within a core gaspath of the aircraft engine, a number of the upstream stator vanes being different than a number of the downstream stator vanes, the downstream stator vanes including:
  - a first vane made of a first material, a major portion of a leading edge of the first vane being circumferentially overlapped by one of the upstream stator vanes such that the major portion of the leading edge of the first vane is not visible along a line of sight parallel to the central axis and along a direction of a flow through the aircraft engine, the major portion of the leading edge of the first vane including 50% or more of a span of the first vane, and
  - a second vane made of a second material having a greater stiffness, strength, and/or ductility than that of the first material, a major portion of a leading edge of the second vane being exposed to foreign object damage and visible through a spacing defined between two of the upstream stator vanes and along the line of sight parallel to the central axis and along the direction of the flow through the aircraft engine, the major portion of the leading edge of the second vane including 50% or more of a span of the second vane.

2. The aircraft engine of claim 1, wherein the major portion is a radially-outer portion.

3. The aircraft engine of claim 1, wherein the major portion includes a tip section.

4. The aircraft engine of claim 1, wherein the first material is aluminum and the second material is steel.

5. The aircraft engine of claim 1, comprising zones circumferentially distributed about the central axis where major portions of leading edges of the downstream stator vanes are exposed via the spacing, the first vane located between two of the zones, the second vane located within one of the zones.

6. The aircraft engine of claim 1, wherein the stiffness of the second material is at least two times greater than that of the first material.

7. The aircraft engine of claim 1, wherein the downstream stator includes vane segments distributed about the central axis, each of the vane segments having one or more of the downstream stator vanes.

8. The aircraft engine of claim 7, wherein the vane segments include a first vane segment each including the first vane, and a second vane segment including the second vane.

9. A stator assembly, comprising:
- an upstream stator having upstream stator vanes circumferentially distributed about a central axis; and
- a downstream stator having downstream stator vanes circumferentially distributed about the central axis, the downstream stator located downstream of the upstream stator relative to an airflow flowing through the stator assembly, a number of the upstream stator vanes being different than a number of the downstream stator vanes, the downstream stator vanes including:
  - a first vane made of a first material, a major portion of a leading edge of the first vane being circumferentially overlapped by one of the upstream stator vanes such that the major portion of the leading edge of the first vane is not visible along a line of sight parallel to the central axis and along a direction of a flow through the stator assembly, the major portion of the leading edge of the first vane including a tip section of the first vane, and
  - a second vane made of a second material having a greater stiffness, strength, and/or ductility than that of the first material, a major portion of a leading edge of the second vane being exposed to foreign object damage and visible through a spacing defined between two of the upstream stator vanes and along the line of sight parallel to the central axis and along the direction of the flow through the stator assembly, the major portion of the leading edge of the second vane including a tip section of the second vane.

10. The stator assembly of claim 9, wherein the major portion of the leading edge includes at least 50% of a span of the downstream stator vanes.

11. The stator assembly of claim 10, wherein the major portion is a radially-outer portion.

12. The stator assembly of claim 9, wherein the first material is aluminum and the second material is steel.

13. The stator assembly of claim 9, wherein the downstream stator includes vane segments distributed about the central axis, each of the vane segments having one or more of the downstream stator vanes.

14. The stator assembly of claim 13, wherein the vane segments include a first vane segment including the first vane, and a second vane segment including the second vane.

15. A method of manufacturing a downstream stator of a stator assembly, the stator assembly including an upstream stator and the downstream stator located downstream of the upstream stator, the method comprising:
- determining circumferential positions around a central axis of the stator assembly where vanes of the downstream stator are at least partially exposed between vanes of the upstream stator thereby susceptible to foreign object damage;
- installing a first vane of the downstream stator between two of the circumferential positions, a major portion of a leading edge of the first vane is circumferentially overlapped by one of the vanes of the upstream stator such that the major portion of the leading edge of the first vane is not visible along a line of sight parallel to the central axis and along a direction of a flow through the stator assembly, the major portion of the leading edge of the first vane including a radially-outer portion of the first vane, the first vane made of a first material; and installing a second vane of the downstream stator at one of the circumferential positions such that a major portion of a leading edge of the second vane is visible through a spacing defined by two of the vanes of the upstream stator, the major portion of the leading edge of the second vane including a radially-outer portion of the second vane, the second vane made of a second material having a greater stiffness, strength, and/or ductility than that of the first material of the first vane.

16. The method of claim 15, wherein the installing of the first vane includes installing the first vane made of aluminum, the installing of the second vane includes installing the second vane made of steel.

17. The method of claim 15, wherein the installing of the second vane includes installing the second vane having the stiffness being two times greater than that of the first vane.

18. The method of claim 15, wherein the downstream stator includes vane segments distributed about the central axis, each of the vane segments having one or more of the downstream stator vanes, the vane segments including a first vane segment including the first vane and a second vane segment each including the second vane, the installing of the second vane at the one of the circumferential positions including installing the second vane segment at the one of the circumferential position.

* * * * *